United States Patent Office 3,425,407
Patented Feb. 4, 1969

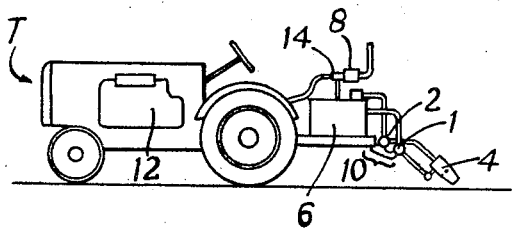
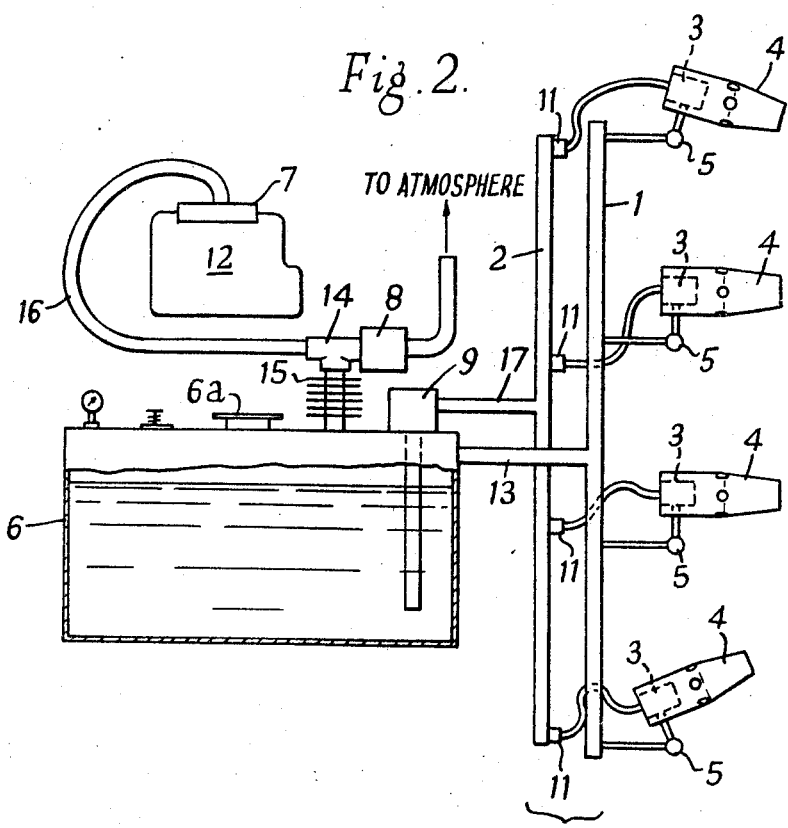

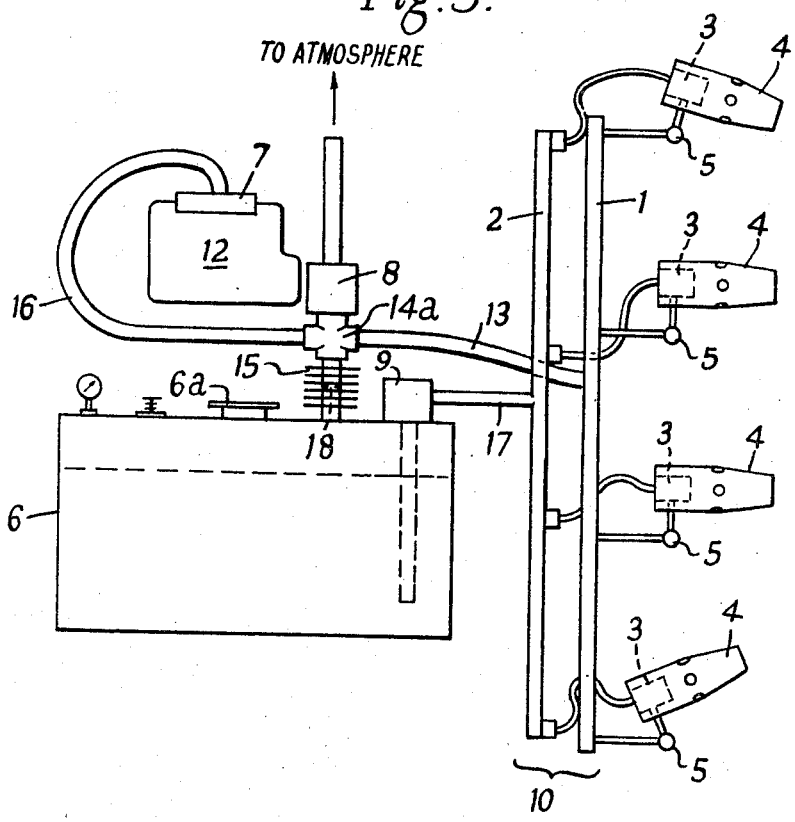

3,425,407
SPRAYING AND FLAME CULTIVATION
IN AGRICULTURE
George T. Furman, North Wembley, England, and
Reginald Percy Fraser, deceased, late of Kingston
Hill, Surrey, England, by Barclays Bank Limited,
executors, North Wembley, England, assignors to
Urquhart's (1926) Limited, Middlesex, England, a
British company
Filed Dec. 29, 1966, Ser. No. 605,930
Claims priority, application Great Britain, Dec. 29, 1965,
55,131/65
U.S. Cl. 126—271.2        11 Claims
Int. Cl. F23c 5/00; B05b 1/24

ABSTRACT OF THE DISCLOSURE

Apparatus for flame cultivation employing liquid fuels. A tank for the liquid fuel is connected to a plurality of two-fluid atomisers adjustably mounted on a boom. Exhaust gases from a tractor propulsion engine are adjustably throttled to create a back-pressure and at least a proportion of the gases is fed to the tank to expel liquid to the atomisers and to the atomisers to constitute the atomising fluid.

---

This invention is concerned generally with spraying in agriculture, and more particularly with the spraying or flame cultivation of land; that is to say, the spraying of insecticides or herbicides, or the cultivation of land by the use of flame to produce selective burning to reduce weeds differentially amongst or between rows of crops to destroy unwanted top growth, e.g., to facilitate harvesting of potatoes, or the general burning of uncultivated land.

Where crops are sprayed by towing a spray boom carrying a number of atomisers atomising insecticides or other treatment liquids, it is common practice to employ small pressure nozzles and to supply the insecticide, herbicide, or other treatment liquid from a hydraulic pump driven by the engine of the towing vehicle, e.g., a tractor. For this purpose small single-hole fan-spray nozzles are commonly employed, and, where small size liquid drops have been required (as in low volume spraying) the nozzle dimensions are necessarily very small and thus easily choked. Alternatively two-fluid atomisers of known type may be employed for these purposes, with the advantage that controlled additional momentum can be given to the fine spray particles, thereby reducing the effect of wind in causing drift, but this involves the employment of air or gas under pressure in the atomisation, and, therefore, of relatively expensive auxiliaries driven by the engine of the tractor or an auxiliary engine. Furthermore, in the usage of certain types of insecticide, such as those containing active parasites, it is undesirable to pass the liquid through pressure gear pumps and the like, and in such a case the use of a two-fluid atomiser is preferable because the liquid is only under low pressure and the orifices are relatively large.

With regard to flame cultivators these have hitherto been operated by employing combustible gases (such as butane and propane stored under pressure) which have been ejected through simple nozzles housed in flame shrouds, the pressure of the stored gas being utilised to entrain the air necessary for combustion. Although such equipment is relatively simple and easy to maintain it has the disadvantage of relatively high fuel costs compared with liquid fuels.

The object of the present invention is to avoid the disadvantages attendant on the employment of two-fluid atomisers for spraying and also to reduce the cost of fuel for flame cultivation by the employment of liquid fuel, without incurring the cost of auxiliaries usually necessary with these atomisers, such as air compressors, liquid pumps or secondary air fans.

The present invention is characterised in that the energy required for ejection of treatment liquids, such as insecticides, or of combustible media for flame generation is derived from products of combustion available in the exhaust manifold of an internal combustion engine; such engine may primarily be provided for the propulsion of a tractor or other motor vehicle adapted for carrying or towing a spraying or flame boom.

The present invention provides a method of spraying a liquid substance in which pressure fluid required for spraying the liquid consists of exhaust gases derived from an internal combustion engine.

The present invention also provides apparatus for spraying a liquid substance, which comprises one or more two-fluid atomisers, a pressurisable container for holding a supply of the liquid to be sprayed and connected with the one or more atomisers, throttling means adapted to be connected in the exhaust system of an internal combustion engine to raise the pressure of the exhaust gases, means for connection on the engine side of the throttling means to supply exhaust gases under pressure to the container to pressurise the container to feed liquid to the one or more atomisers, and means for supplying said exhaust gases under pressure also to the one or more atomisers.

More particularly the invention may employ one or more two-fluid atomisers of known design (namely, atomisers employing air or gas under pressure for atomisation) in conjunction with the internal combustion engine used for driving a tractor or other mobile vehicle, said engine being adapted to supply the necessary gaseous fluid and drive the liquid to the atomisers under pressure. As already indicated this supply energy is derived from combustion products available in the engine exhaust. By this means the atomisation and combustion of liquid fuels, such as gas oils or light distillates, is accomplished without the use of high cost auxiliaries. Unexpectedly it has been found that the exhaust gases, although these contain no oxygen to support combustion, do nevertheless constitute an efficient atomising medium and by their temperature aid the rapid vaporisation of the oil particles.

By means of the equipment above referred to the invention enables spraying to be practised by the use of the pressure generated in the exhaust system of the internal combustion engine which is adapted to supply exhaust gases and drive the treatment liquid under pressure to one or more of the two-fluid atomisers carried by or towed behind the trailer or other vehicle.

Alternatively, using substantially the same equipment the invention enables a method of flame cultivation to be practised employing the pressure generated in the exhaust system of the internal combustion engine, in this case to supply exhaust gases and drive liquid fuel under pressure to one or more two-fluid atomisers to produce a jet or jets of flame adapted to issue from shrouds mounted on a boom carried or towed behind the vehicle.

For the performance of either of the methods of treatment referred to, a gaseous exhaust stream from the engine is throttled in such a manner as to raise the pressure within some part of the exhaust system to a suitable gauge pressure such as one atmosphere and then tapping off the required amount of the exhaust gases under pressure to one or more atomisers mounted on a spray boom, at the same time supplying pressure to a space above the treatment liquid or fuel within a container thereby feeding the treatment liquid or fuel from the container under pressure to the atomisers so that a wide swathe may be covered with flame or spray issuing from said atomisers.

The atomisers may be housed individually in tubular chambers, which may serve as combustors and into which secondary air for combustion is entrained by the jet energy of the gas issuing from the atomisers. Alternatively, a number of atomisers may be arranged under a common hood or protective screen. The atomisers may be so mounted on the boom that they can be directed at angles to the line of motion of the vehicle.

The control equipment employed and which is adapted for attachment to the tractor may be designed that a single operation may close a first valve in the exhaust line, whereby throttling is obtained and exhaust gas is fed to the atomisers or burners and also open a second valve through which the atomisers are supplied with liquid insecticide or liquid fuel as the case may be. In the case of liquid fuel the burners may be ignited automatically in a known manner.

In operation in the field the devices comprise a pressurisable tank of required liquid carried on a tractor or mobile vehicle which carries or tows the spray bar or boom on which the atomisers or burners are mounted, the vehicle being driven to traverse the land at the required speed to obtain the desired effect.

It is anticipated that the device may find wider use and application in and around the farm than simply in the fields, for example for spraying disinfectants or chemicals in yards, cowsheds and so on, or for the spraying of whitewash on and in the farm buildings.

The accompanying drawings show embodiments of apparatus suitable for practise of the invention. In the drawings:

FIGURE 1 is an elevation of a tractor vehicle equipped with one form of apparatus embodying this invention;

FIGURE 2 is a generally diagrammatic representation of the apparatus included in FIGURE 1, and FIGURE 3 is a representation similar to FIGURE 2 of another form of apparatus embodying this invention.

As seen in FIGURE 1 the apparatus is adapted for attachment to a tractor T or other motor vehicle, structural details of which are not shown as they are not relevant to the invention. As seen in FIGURE 2 the apparatus includes tubes 1, 2 carrying gas and liquid respectively suitably secured together to form a spray boom 10, which carries a number of units each comprising a two-fluid atomiser 3 surrounded by a flame-stabilisation shroud 4; each unit is mounted so that it can be swivelled in required directions on a swivel or rotary joint 5. Liquid is fed to each atomiser 3 from the tube 2 through suitable valves 11 adjustable to vary the quantity of liquid fed to each atomiser. A supply of the liquid is contained in a tank 6 which has a sealable filler opening 6a and is adapted to be pressurized by supplying gases under pressure to the tank through a pipe 15 which suitably is gilled or finned to act as a cooler for the gases flowing therethrough. The tractor T or vehicle has a propulsion engine which is an internal combustion engine 12 having an exhaust manifold 7. A pipe 16 is connected to the exhaust manifold 7 and exhaust gases from the manifold 7 are led by the pipe 16 to one arm of a T-piece 14, to a second arm of which is connected a throttling valve 8. Gases escaping through the valve 8 are exhausted to atmosphere. The pipe 15 is connected to the third arm of the T-piece 14, on the engine side of the valve 8. By manipulating the throttling valve 8 to control the amount of exhaust gases which flows through the valve 8 and to atmosphere, a back-pressure is created in the engine exhaust manifold, so raising the pressure of the exhaust gases which are supplied in the required amount through the pipe 15 to the tank 6 to pressurise the tank. From the tank 6 the exhaust gases are also fed to the gas tube 1 through a pipe 13. The pressurised liquid in tank 6 is fed to the liquid tube 2 through a master valve 9 and a pipe 17; the valves 8 and 9 may be coupled together for common operation.

Liquid fuel in the tank 6 may act as a trap for carbon particles in the exhaust gases, these particles being absorbed into the fuel in the tank from the gases passing into the tank from the pipe 15, the carbon so absorbed into the fuel passing forward with the fuel to be burned at the atomisers 3 instead of passing with the gases into and possibly blocking the gas passages in the atomisers by deposition therein.

Alternatively it may be found desirable, for instance in order to avoid overheating the liquid contents of the tank 6 by heat contained in the exhaust gases, to provide for the main gas flow to the gas tube 1 to be independent of the tank 6. An apparatus modified for operation in this manner is represented in FIGURE 3 and differs from the apparatus of FIGURE 2 in that the T-piece 14 is replaced by a four-armed connector 14a. The pipes 15 and 16 and the valve 8 are connected respectively to three arms of the connector 14a as before, and the pipe 13 is connected directly to the fourth arm of the connector 14a instead of to the tank 6. An orifice 18 is provided in the pipe 15. The flow of gas into the tank 6 needed to pressurise the contents is relatively small and when the apparatus is in operation only relatively small additional volumes of gas need to be supplied to maintain the pressure in the tank as the liquid is gradually expelled over a considerable period. Because exhaust gases are not flowing continuously through the tank the gases above the liquid in the tank are effectively cold.

Instead of using the four-armed connector 14a two T-pieces 14 may be employed mounted one in front of the other to provide the necessary connections to the pipes 16, 15, 13 and the valve 8; this modification is not illustrated.

It will generally be found convenient to mount the tank 6 on the tractor or vehicle as shown in FIGURE 1; the boom may be attached to the tractor or vehicle or may be provided with wheels to enable it to be towed behind the tractor or vehicle.

What we claim is:

1. A method for flame cultivation employing a liquid fuel, comprising developing a back-pressure in the exhaust system of an internal combustion engine, tapping off exhaust gases under pressure and supplying said gases to a container for the liquid fuel to pressurise the container and feed liquid fuel from the container to at least one two-fluid atomiser as the fluid to be atomised, also supplying said exhaust gases under pressure to the at least one atomiser as the atomising fluid, and entraining secondary air for combustion of the atomised liquid fuel by the jet energy of the gas issuing from said at least one atomiser.

2. A method according to claim 1 in which there are a plurality of atomisers on a boom adapted for attachment to a tractor which are supplied with liquid fuel and exhaust gases, and wherein the said internal combustion engine is the tractor propulsion engine.

3. Apparatus for flame cultivation which comprises at least one two-fluid atomiser, a pressurisable container for holding a supply of a liquid fuel and connected with the at least one atomiser, an internal combustion engine having an exhaust system, throttling means connected in the exhaust system of the internal combustion engine to raise the pressure of the exhaust gases, means connected to the engine side of the throttling means supplying exhaust gases under pressure to the container to pressurise the container to feed liquid fuel to the at least one atomiser, means supplying said exhaust gases under pressure also to the at least one atomiser, and means associated with each atomiser for enabling secondary air for combustion of atomised liquid fuel to be entrained by the jet energy of the exhaust gases issuing from the atomiser.

4. An apparatus according to claim 3 further comprising a boom, there being a plurality of said atomisers pivotally mounted on said boom, said boom being adapted to be connected to a mobile vehicle.

5. An apparatus according to claim 4, in which said means supplying gases to the container has a throttling valve therein controlling the supply of exhaust gases under pressure, and said means supplying gases to the atomiser has a valve controlling the feeding of liquid fuel from the container to the plurality of atomisers.

6. An apparatus according to claim 5, further comprising means coupling said valves together for common operation.

7. An apparatus according to claim 5 in which there is a valve connected with each atomiser and adjustable to vary the quantity of liquid fuel fed to each atomiser.

8. An apparatus according to claim 5 in which said means supplying gases to the container are pipe and gas cooling means for passing the exhaust gases under pressure to the container, and said means for supplying gases to the atomiser are pipe means for passing the gases to the atomisers.

9. An apparatus according to claim 8 in which said pipe and gas cooling means are provided with an orifice.

10. A tractor vehicle comprising an internal combustion propulsion engine adapted to supply exhaust gases, and an apparatus for flame cultivation which comprises at least one two-fluid atomiser, a pressurisable container for holding a supply of a liquid fuel and connected with the at least one atomiser, throttling means connected in the exhaust system of the internal combustion engine to raise the pressure of the exhaust gases, means connected to the engine side of the throttling means supplying exhaust gases under pressure to the container to pressurise the container to feed liquid fuel to the at least one atomiser, means supplying said exhaust gases under pressure also to the at least one atomiser, and means associated with each atomiser for enabling secondary air for combustion of atomised liquid fuel to be entrained by the jet energy of the exhaust gases issuing from the atomiser.

11. An apparatus according to claim 10, further cmprising means coupling said valves together for common operation.

References Cited

UNITED STATES PATENTS

| 2,391,027 | 12/1945 | McLemore et al. | 126—271.2 |
| 2,694,393 | 11/1954 | Simpson | 126—271.2 |
| 2,721,416 | 10/1955 | Perry | 239—129 |
| 2,901,182 | 8/1959 | Cragg et al. | 239—129 |
| 3,140,574 | 7/1964 | Brown | 239—129 X |

CHARLES J. MYHRE, *Primary Examiner.*

U.S. Cl. X.R.

239—129